United States Patent [19]

Sanjuan

[11] Patent Number: 5,074,202
[45] Date of Patent: Dec. 24, 1991

[54] CENTRIFUGE

[75] Inventor: Antonio B. Sanjuan, Barcelone, Spain

[73] Assignee: Moulinex (Societe Anonyme), Bagnolet, France

[21] Appl. No.: 555,372

[22] Filed: Jul. 20, 1990

[30] Foreign Application Priority Data

Aug. 4, 1989 [FR] France .............................. 89 10562

[51] Int. Cl.$^5$ .............................................. A23N 1/00
[52] U.S. Cl. .......................................... 99/511; 99/509
[58] Field of Search ......................... 99/495, 510–513; 494/43; 210/247, 379; 241/28, 78

[56] References Cited

U.S. PATENT DOCUMENTS

| 1,343,439 | 6/1920 | Dostal | 99/511 |
| 2,227,098 | 12/1940 | MacLean | 99/512 |
| 4,700,621 | 10/1987 | Elger | 99/511 |

FOREIGN PATENT DOCUMENTS

| 3639804 | 5/1988 | Fed. Rep. of Germany | 99/495 |
| 441920 | 12/1974 | U.S.S.R. | 99/511 |

Primary Examiner—Philip R. Coe
Assistant Examiner—Randall E. Chin
Attorney, Agent, or Firm—Young & Thompson

[57] ABSTRACT

A centrifuge comprising a basin (9) adapted to receive centrifuged juice and in which is disposed a basket (1) comprising a perforated screen (2) and a lower ring (3) which is adapted to couple in rotation with a drive (4) secured to a motor shaft (5) and which comprises a skirt (8) extending downwardly and outwardly. The basin (9) has in its lower portion a gutter (11) limited toward the drive (4) by a small circular collar (12) extending upwardly between the drive (4) and the skirt (8). The skirt (8) of the basket (1) has on its lower wall (15) vanes (16) adapted to create, during rotation of the basket (1), an air current directed downwardly and toward the periphery (14) of the basin (9), so as to retain the juice in the gutter (11).

3 Claims, 1 Drawing Sheet

CENTRIFUGE

The invention relates to centrifuges for domestic use, used to extract fruit juice, vegetable juice or the like.

The invention relates more particularly to a centrifuge comprising a basin adapted to receive the juice from centrifugation and in which is disposed a basket comprising a perforated screen and a lower ring which is adapted to couple in rotation with a drive secured to a motor shaft and which comprises a skirt extending downwardly and outwardly, the basin providing in its lower portion a gutter limited toward the drive by a small circular collar extending upwardly between the drive and the skirt.

In known centrifuges, the small circular collar serves to prevent the juice from reaching the motor when passing below the drive and through the opening through which passes the shaft provided in the base supporting the basin, and thus to protect the motor. Nevertheless, this small collar is not always as effective as could be wished. Thus, during rotation at high speed of the basket, the juice has a tendency to be drawn along the length of the small collar and it can overflow, causing great damage to the motor. It is moreover very difficult and troublesome to provide a sealed joint at the level of the opening because of the high speed of rotation (about 12,000 rpm).

The present invention has for its object to overcome this drawback and to provide an apparatus which prevents the overflow of the liquid above the small collar.

According to the invention, the sleeve of the basket comprises on its lower wall dynamic means adapted to create, during rotation of the basket, an air current directed downwardly and toward the periphery of the basin, so as to retain the juice in the gutter.

The present invention therefore makes use of the reaction of the air on the dynamic means driven at high speed to create, during rotation of the basket, an air current which forces the liquid from the region of the small collar and retains the juice in the bottom of the gutter.

The characteristics and advantages of the invention will become clearer from the description which follows, by way of example, with regard to the accompanying drawing, in which.

Figure 1:
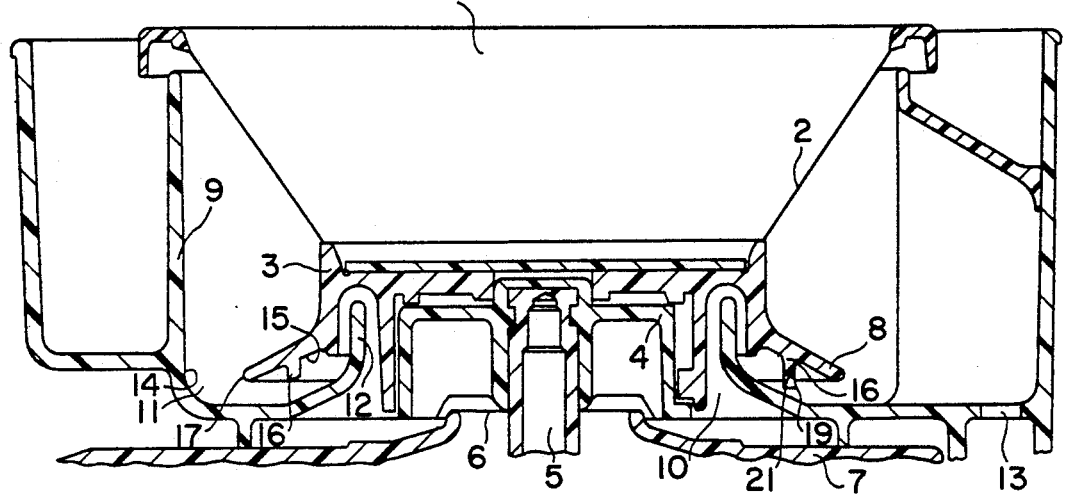
FIG. 1 is a partial vertical cross-sectional view of a centrifuge according to the invention.

The centrifuge shown in FIG. 1 comprises a basket 1 having a perforated screen 2 and a lower ring 3 which is adapted to couple in rotation with a drive 4 secured to a motor shaft 5 which passes through an opening 6 provided in a base 7 containing a motor (not shown). The lower ring 3 of the basket 1 comprises a skirt 8 extending downwardly and outwardly. The basket is disposed in a basin 9 adapted to receive the juice from centrifugation. The basin 9 is supported removably by the base 7 and comprises an opening 10 for passage of the drive 4. The basin 9 has in its lower portion a gutter 11 limited toward the drive 4 by a small circular collar 12 extending upwardly between the drive 4 and the skirt 8. An outlet 13 for evacuation of juice is provided in the bottom of the gutter 11 adjacent the periphery 14 of the basin 9. According to the invention, the skirt 8 of basket 1 comprises on its lower wall 15 dynamic means 16 adapted to create, during rotation of the basket 1, a current of air directed downwardly and toward the periphery 14 of the basin 9, so as to retain the juice in the gutter 11. The dynamic means 16 are perferably constituted by a series of vanes directed downwardly, each extending in a vertical plane in the vicinity of the periphery 17 of the skirt 8 toward the drive 4 and oriented in the direction of rotation F at an acute angle a relative to the tangent T at the periphery 17.

Thus during high speed rotation of the basket 1, the reaction of the air against the vanes 16 creates an air current which drives the liquid from the region of the small collar 12 where it has the tendency to be drawn and which thus retains the juice in the bottom of the gutter 11. Overflowing above the small collar 12 is thus rendered impossible.

Figure 2:
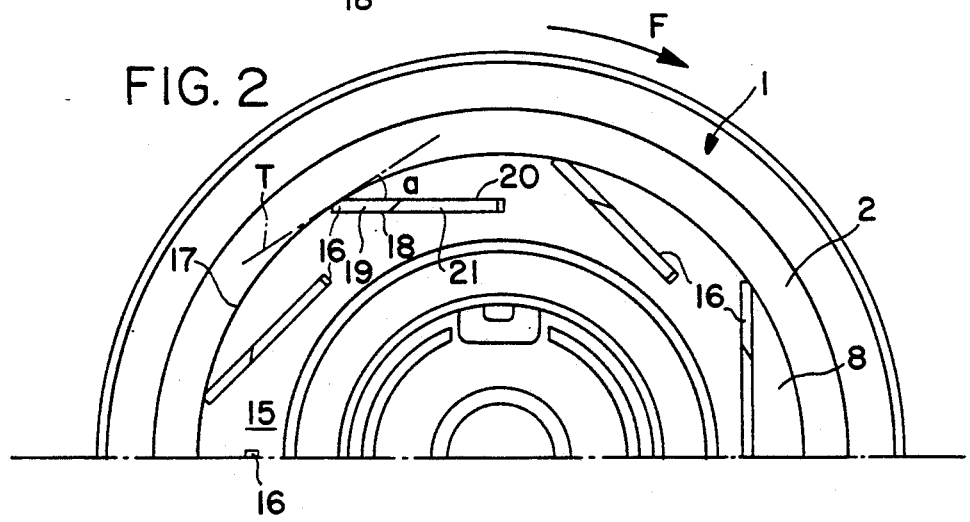
FIG. 2 is a partial view from below of the basket of the centrifuge.

As shown in FIG. 2, the angle a made by each vane 16 with a tangent T at the periphery 17 of the skirt 8 is between 30 and 40° preferably equal to about 35°.

Figure 3:
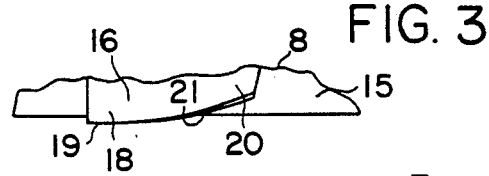
FIG. 3 is a partial view in elevation of dynamic means constituted by a vane.

As is shown particularly in FIGS. 2 and 3, each vane 16 is comprised of two contiguous parts, a first part 18 adjacent the periphery 17 of the skirt 8, which has a substantially horizontal lower edge 19, and a second part 20 spaced from periphery 17, which has a chamfered lower edge 21 whose inclination is directed both toward the drive 4 and toward the first part 18.

This arrangement permits increasing the air current produced during rotation.

In operation, the drive 4 secured to the motor shaft 5 drives in rotation at high speed the basket 1 containing fruit or the like. By centrifugal force, the juice passes through the perforated screen 2 and falls in the gutter 11 of the basin 9. The juice has the tendency to be drawn along the length of the small collar 12 then along the motor shaft 5 under the suction created by the rotating parts of the motor. The air current produced by the vanes 16 opposes this draft and drives the juice from the region of the small collar 12 and retains it in the bottom of the gutter 11 toward the periphery 14 of the basin 9, thus preventing the juice from overflowing the small collar 12. Moreover, the flow of the juice through the outlet 13 is promoted.

What is claimed is:

1. In a centrifuge comprising a basin (9) adapted to receive centrifuged juice and in which is disposed a basket (1) comprising a perforated screen (2) and a lower ring (3) which is adapted to couple in rotation with a drive (4) secured to a motor shaft (5) and which comprises a skirt (8) extending downwardly and outwardly, the basin (9) having in its lower portion a gutter (11) limited toward the drive (4) by a small circular collar (12) extending upwardly between the drive (4) and the skirt (8); the improvement in which the skirt (8) of the basket (1) comprises on its lower wall (15) dynamic means (16) adapted to create, during rotation of the basket (1), an air current directed downwardly and toward the periphery (14) of the basin (9), so as to retain the juice in the gutter (11), said dynamic means (16) comprising a series of vanes directed downwardly, each extending from the vicinity of the periphery (17) of the skirt (8) toward the drive (4) and oriented in the direction of rotation F of said ring (3) at an acute angle (A) to the tangent (T) at the periphery (17), each said vane (16) having a first portion (18) adjacent the periphery (17) of the skirt (8), which has a substantially horizontal lower edge (19), and a second portion (20) spaced from the periphery (17), which has chamfered lower edge

(21) whose inclination is directed both toward the drive (4) and toward said first portion (18).

2. Centrifuge according to claim 1, wherein each said vane (16) extends in a vertical plane.

3. Centrifuge according to claim 1, wherein said angle (a) of each said vane (16) to the tangent (T) at the periphery (17) of the skirt (8) is between 30° and 40°.

* * * * *

UNITED STATES PATENT AND TRADEMARK OFFICE
CERTIFICATE OF CORRECTION

PATENT NO. : 5,074,202
DATED : December 24, 1991
INVENTOR(S) : Antonio BASORA SANJUAN It is certified that error appears in the above—identified patent and that said Letters Patent is hereby corrected as shown below:

On the title page, under item [19], change "Sanjuan" to --Basora Sanjuan--; and

In Item [75], change the name of the inventor to

--Antonio Basora Sanjuan--.

Signed and Sealed this

Sixteenth Day of March, 1993

*Attest:*

STEPHEN G. KUNIN

*Attesting Officer*  *Acting Commissioner of Patents and Trademarks*